April 5, 1932.    F. C. BIGGERT, JR    1,852,282
ROTARY FLYING SHEAR MECHANISM
Filed May 29, 1931
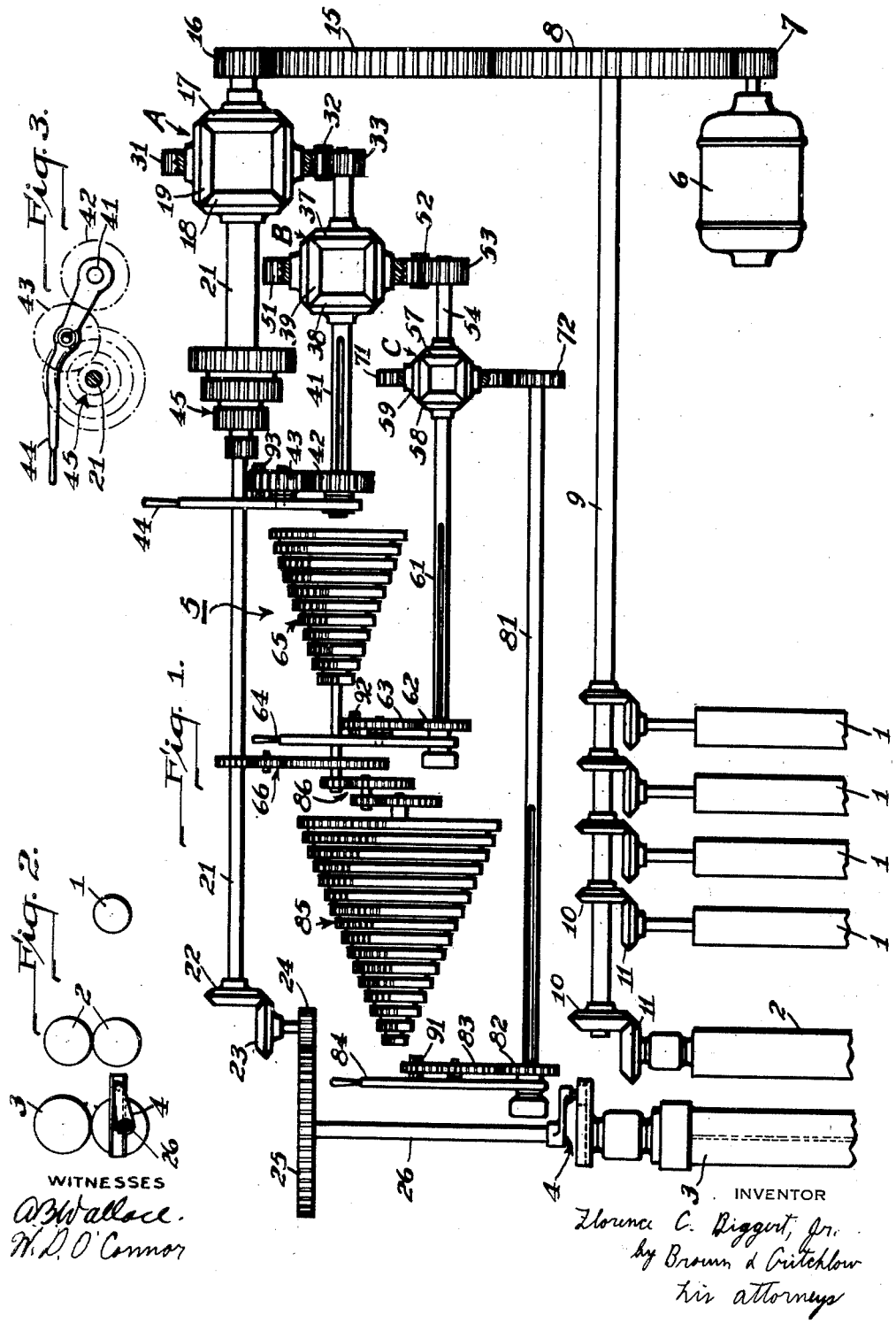
WITNESSES
OBWallace
W.D.O'Connor
INVENTOR
Florence C. Biggert, Jr.
by Brown & Critchlow
his attorneys Patented Apr. 5, 1932

1,852,282

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

ROTARY FLYING SHEAR MECHANISM

Application filed May 29, 1931. Serial No. 540,921.

This invention pertains generally to flying shears for cutting into lengths strips of material while the material is in motion, as for instance strip metal as it emerges from a rolling mill, or subsequently thereto, and particularly to flying shears of the adjustable type.

Flying shears have been constructed heretofore embodying adjusting mechanism for regulating the length to which the material is to be cut. In certain types, the adjustment is accomplished by means of cone pulleys and a belt, or other similar speed changing mechanism. Such shears are capable of being adjusted to cut different lengths of material, but the adjusting means are of such nature that close adjustment and a high degree of accuracy can not be obtained inasmuch as the drive mechanism is not positive and the speed ratio is subject to variations as the result of belt slippage or the like.

If accurate work is to be done, it has been necessary heretofore to utilize a flying shear having positive driving connections between the shear and the material feeding device. Such shears are subject to the disadvantage that in order to change the length of the cut it is necessary to remove parts from the shear drives, and substitute other parts, or make other alterations of similar nature.

The principal object of the invention is to provide a flying shear mechanism having selective, quickly-alterable and mechanically-positive means connecting the driving motor to both the flying shear and the feeding mechanism, whereby strip material may be cut accurately to selected predetermined lengths.

In accordance with this invention I provide a gear changing mechanism for quickly altering the ratio between the speed of advance of the material to be cut and the frequency of operation of the shears, that may be readily manipulated by the machine operator to accurately cut the material to the desired length. In this mechanism there is provided one gear shifting lever for setting the mechanism to cut at least a predetermined number of major units of length as, for instance, feet; a second for adding to the major units a desired number of lesser units as, for instance, inches; and a third for adding to the length of cut provided by the gear shifting devices for these major and minor units, fractional parts of the minor unit, for example sixteenths of an inch.

As a specific example, if it is desired to cut moving sheet material accurately to lengths of say 8 feet and 5-9/16 inches, the first shifting lever is set in the position for providing a cut of the length 8 feet. The second gear shifting lever is then moved to the position in which it adjusts the gearing to add to the length established by the first gearing the amount of 5 inches. The third gear shifting lever may then be set to add to the length of cut already established, the amount of 9/16 of an inch. The mechanism actuated by the gear shifting levers is so constructed that any combination of units that may be set on the three gear shifting levers are directly added together. Thus if the first and third levers are adjusted to indicate lengths of 6 feet and 3/16 of an inch, respectively, and the second lever to indicate zero, the material will be cut to the length of 6 feet and 3/16 of an inch. If now the second gear shifting lever is adjusted to the position which indicates a cut of 4 inches, the strip will be cut to the length of 6 feet and 4-3/16 inches.

For carrying out this invention, and to achieve the stated and other objects, apparatus may be utilized constructed in accordance with that described herein and shown in the accompanying drawings, of which Fig. 1 is a diagrammatic representation of a flying shear and feed roll mechanism having associated with it a transmission mechanism embodying my invention; Fig. 2 a diagram representing the rotary shear and cooperating feeding rolls in end elevation; and Fig. 3 a view in section showing one of the gear shifting devices.

Referring more particularly to the drawings, strip material to be cut may be brought to the flying shears by a conveyor, such as a roll table represented in the drawings by the driven rolls 1. From the roll table the strip material passes between a pair of pinch rolls 2, the bottom one only of which is shown in Fig. 1, connected to be driven in the same direction as are the rolls 1 of the roll table. As the strip emerges from the pinch rolls 2, it is cut to predetermined length by a flying shear mechanism 3, of which likewise only the lower element is shown in Fig. 1. The flying shear 3 may be of the type that normally makes one cut for each revolution. To regulate the length at which the moving strip is cut by the shears 3, it is necessary to adjust the ratio of the speed of rotation of the pinch rolls 2 to the speed of rotation of the flying shear 3. As will be understood, to increase the length of material cut by the shears the peripheral travel of the pinch rolls 2 for each revolution of the shear 3 must be increased.

As an incident to the change in the relative rotary speeds of the feed rolls and the cutters of the flying shear, it is necessary to make suitable compensation in the speed of the cutters at the instant at which the cut is made to synchronize the forward motion of the shear with the advance of the strip being cut. This synchronization is accomplished, without interfering with the total number of revolutions made by the shears, by means of a quick return or Scotch yoke mechanism 4 which operates the shear 3 at a non-uniform peripheral speed, and which may be readily adjusted in well known manner to synchronize the peripheral speed of the shears with the speed of advance of the material at the instant at which the shears engage the material to cut it.

To insure a high degree of accuracy in the operation of the flying shears 3, they and the feed rolls 2 are interconnected in a mechanically positive manner through a transmission mechanism designated generally by the reference numeral 5, having speed changing gearing constructed in accordance with my invention. The feed rolls 2 and the flying shear 3 are driven by means of a suitable driving motor 6. Frequently the material to be sheared arrives on the roll table 1 from some other piece of apparatus, for instance a rolling mill, at a substantially constant mill speed. Consequently the roll table and the feed rolls must be driven at a substantially constant speed corresponding to the speed of the material to be sheared. To this end the motor 6, which may be of any well known constant speed type, is connected to drive the roll table 1 at constant speed by a pinion 7 on its armature shaft cooperating with a gear wheel 8 on a driven shaft 9. The shaft 9 is provided with a plurality of bevel gears 10 which engage cooperating bevel gears 11 on the roll table 1 and on the lower pinch roll 2 for driving them in synchronism. As is well known, the upper is driven from the lower pinch or feed roll, and in the opposite direction, by means of cooperating pinions, not shown, disposed in intermeshing relation at one end of the rolls.

In normal operation the absolute speed of rotation of the shear 3 is regulated by means of the transmission mechanism 5 in such manner that the shear 3 will make one revolution during the time that the predetermined amount of material to be sheared is advancing by the pinch rolls 2. The relative speeds of the shear and the advancing material are then synchronized by adjusting the quick return mechanism 4 which is ordinarily provided with a scale or other indicating means to facilitate synchronization. The scale is graduated in lengths of cut, hence it is merely necessary to set the mechanism at the position indicated to correspond with the length of material to be cut in order to effect accurate synchronization of the material and shear speeds.

In the practical embodiment of my invention, the transmission mechanism 5 is arranged in a more compact manner than here shown, and is enclosed within a suitable housing. The illustrative embodiment of the invention may be considered as arranged to cut material into lengths of from 5 to 10 feet in steps of one-sixteenth of an inch. By making certain well known changes in the shear 3 to adapt it to skip every other cut, that is to make one cut for each two revolutions, the range of operation may be extended to cut material of lengths from 10 to 20 feet at any interval of one-eighth of an inch.

In considering the operation of the transmission mechanism 5, it will be assumed that the shear speed is synchronized to that of the advancing material, by properly adjusting the quick return mechanism 4, each time a change is made in the adjustment of the transmission mechanism. To simplify the explanation, the discussion will be based on a cycle of one revolution of the rotary shear 3, and it will be explained how a change in the setting of the transmission mechanism 5 changes the amount of material fed through the feed rolls 2 while the shear 3 is turning through one revolution.

Power for operating the shear 3 is transmitted from the motor 6 through the pinion 7 and the gear 8 to an intermediate gear 15 which meshes with a pinion 16 connected to a sun gear 17 of a differential mechanism A. Another sun gear 18 of the differential A is driven from the sun gear 17, in the opposite direction, through a spider or planetary gear system 19. The sun gear 18 is mounted on the end of a transmission shaft 21 having at its other end a bevel gear 22 meshing with a complementary bevel gear 23. From the gear 23, power is transmitted by a pinion 24 to a gear 25 on the end of a shaft 26 at the other end of which is mounted the quick return mechanism 4 which operates the shear 3.

In this embodiment of my invention, when it is desired to cut material to the minimum length, which in this case is 5 feet, the spider 19 of the differential A is held stationary. For one revolution of the shear 3 the motion communicated through the shafts 26 and 21 and their connecting gear train is transmitted at a one to one ratio through the differential A, hence by the gear train 16, 15 and 8 to the shaft 9 to turn the feed rolls 2 a sufficient amount to advance the material a distance of 5 feet.

When it is desired to cut the material to lengths longer than the minimum length, it is necessary to turn the feed rolls 2 a greater number of revolutions during one revolution of the shear 3. This is accomplished by turning the spider 19 of the differential A in such direction as to increase the speed ratio at which the motion is transmitted from the shear 3 through the differential A to the feed rolls 2. By regulating the rate at which the spider 19 is turned, any predetermined speed ratio may be attained. As shown, the spider 19 has mounted on its outer surface a ring gear 31 which meshes with an intermediate pinion 32 which, in turn, engages a pinion 33 connected to a sun gear 37 of a second differential B which is thus connected in cascade relation to differential A. The other sun gear 38 of the differential B is connected to the sun gear 37 by means of a spider mechanism 39, and is mounted on the end of a splined shaft 41. Slidably mounted on this shaft is a gear 42 which meshes with a gear 43 carried by a gear shifting lever 44 also mounted to slide on the shaft 41 and to move with it the gear 42. The gear 43 is disposed to be moved by the lever 44 into engagement with any one of four stepped gears 45 on the shaft 21.

When the shiftable gear 43 is in engagement with one of the gears 45, motion is transmitted from the shaft 21 through the differential B to the spider 19 of the differential A to turn it in the direction opposite to that in which the shaft 21 is turned. When the spider 19 is turned in this direction the sun gear 17 is caused to rotate faster than the sun wheel 18, and consequently, through the interconnecting gearing, the feed rolls 2 are caused to feed forward a larger amount of material for one revolution of the shears 3.

As previously explained, when the spider 19 of the differential A is held stationary, the mechanism is arranged to cut sheet material into pieces 5 feet long. If now we assume that the spider 39 of the differential B is held stationary, and the shiftable gear 43 is engaged with the smallest of the gears 45 on shaft 21, the spider 19 of the differential A will be rotated at such speed that the mechanism will operate to cut pieces 6 feet long. The other gears 45 are proportioned to cause the shear to operate to cut pieces 7, 8 and 9 feet long, respectively. In adjusting the shearing mechanism to cut any desired length within the range of the apparatus, the operator simply sets the lever 44, which may be considered the first lever, to a position which causes the shiftable gear to engage the gear 45 which corresponds to the major unit in which the length of the piece to be cut is expressed.

If it is desired to cut material to pieces of length evpressed in a fraction of the major unit, it is simply necessary to add to the major unit by turning the spider 39 of the differential B in the same manner that the major unit was added to the basic length of 5 feet by turning the spider 19 of the differential A. Inasmuch as the major unit is expressed in feet, the fractional or minor unit is, for convenience, expressed in inches, and my apparatus is constructed to move the spider 39 of the differential B to change the speed ratio between the sun gears 38 and 37 in such manner that the spider 19 of the differential A is effected to add one or more inches to the length of the material fed through the pinch rolls 2 for each revolution of the flying shears 3.

To this end, the spider 39 of the differential B is provided with a ring gear 51 driven by an intermediate pinion 52 from a gear 53 at one end of a shaft 54 having at its other end a sun gear 57 of a third differential C which is thus connected in cascade relation to the differentials B and A. The sun gear 57, together with another sun gear 58, meshes with a spider or planetary gear assemly 59 in the usual manner. Sun gear 58 is mounted on one end of a splined shaft 61 on which is slidably mounted a gear 62 meshing with a shiftable gear 63 carried on a shifting lever 64. The shiftable gear 63 is disposed to be engaged with any one of eleven stepped gears 65 constituting a cone gear similar to the stepped wheels 45. The gears 65 are connected to be driven by the shaft 21 by a train 66 of three gears in such manner that they operate in the same direction of rotation as does the shaft 21. The eleven gears 65 are so proportioned that they operate to add sufficient motion to the spider 39 of the differential B, and hence through the transmission mechanism to the feed rolls 2, to increase the length of the material fed through the rolls from one to eleven inches over the range from the smallest to the largest gear 65. This increase of even inches occurs with the spider 59 of the differential C held stationary and with the sun gears 58 and 57, respectively, rotating at equal speeds in opposite directions. Hence if the operator wishes to cut material to lengths measured in feet and inches he sets the lever 44 to the position at which the desired number of feet of material will be fed through the rolls 2 and then adjusts the lever 64 to engage the shiftable gear 63 with the gear of the group 65 which will operate to add, or cause to be fed through in addition, the desired number of inches of material. The additive effect results from the cascade connection between the differentials A and B.

If now it is desirable to cut the material to some length other than a length expressed in even feet and inches, for example to a length expressed in feet, inches and a fraction of an inch, this may be accomplished by moving the spider 59 of the differential C a sufficient amount to feed through the rolls 2 the additional fraction of an inch. This is done in a manner similar to that described relative to the differentials A and B, by means of a ring gear 71 on the spider 59, turned by a gear 72 on a splined shaft 81 which carries a slidable gear 82 meshing with a shiftable gear 83 on a shifting lever 84. By means of the lever 84 the shiftable gear 83 may be engaged with any one of 16 stepped gears 85 that constitute another cone gear. These gears 85 are connected to the shaft 21 by means of a gear train 86 and the gear train 66 in such a manner that they rotate in the same direction as do the gears 45 on the shaft 21 and the gears 65. These gears are proportioned to increase the length of material fed through the rolls 2 by increments of 1/16 of an inch throughout the range of one inch.

To cut the strip material to lengths expressed in feet, inches, and sixteenths of an inch it is simply necessary to set the levers 44 and 64 to the positions corresponding to the feet and inches, respectively, as before explained and then to set the lever 84 to engage the gear of the group 85 which corresponds with the fraction of an inch desired.

Although only fifteen gears 85 are needed to provide adjustment for lengths expressed in feet, inches and sixteenths of an inch, for convenience sixteen gears 85 are provided to enable material to be cut in lengths of even 10 feet. This may be accomplished by setting the lever 44 to feed 9 feet of material, the lever 64 to feed an additional 11 inches, and the lever 84 to feed 16/16 of an inch which, because of the additive effect of the mechanism, results in the feeding of a total of ten feet.

In cutting material to other lengths expressed in even feet and inches only, the gears 85 are ordinarily not utilized, and the spider 59 of the differential C is held stationary by engaging the shiftable gear 83 on the lever 84 with a stationary toothed rack 91. Suitable means are provided for holding the gear wheel 83 in engagement with the rack 91, and likewise for holding it in engagement with any one of the gears 85 with which it may be meshed. With the spider 59 locked by thus positioning the shifting lever 84, the differentials A and B function as hereinbefore explained to feed the predetermined number of feet and inches of material through the feed rolls 2.

For cutting material of lengths expressed in even feet only, the spider 59 of the differential C is locked in stationary position as just explained, and the lever 64, associated with the differential B, is shifted to disengage the shiftable gear 63 from its cooperating gears 65, and move to bring the gear 63 into engagement with a stationary toothed rack 92. This prevents the shaft 61 from turning, and consequently prevents rotation of the spider 39 of the differential B.

To cut material in pieces of the basic length, which in this instance is 5 feet, the spiders 59 and 39 of the differentials C and B, respectively, are locked as just explained, and, in addition, the lever 44 associated with the differential A is moved to bring the shiftable gear 43 into engagement with a stationary toothed rack 93 that prevents rotation of the shaft 41. Inasmuch as the spider 39 has been locked in position, the spider 19 of the differential A is prevented from rotating. However, with the spider 19 locked in position the sun gears 18 and 17 are free to rotate to transmit motion at a one to one ratio through the system in such manner that exactly five feet of material is advanced through the feed rolls 2 for each revolution of the flying shears 3.

In the event that material of length 5 feet and a fraction of an inch is required, the levers 44 and 64 are positioned to lock the shafts 41 and 61, and the lever 84 is shifted to engage the gear 83 with the gear wheel 85 corresponding to the fraction of an inch to be added to the basic five foot length. This will cause the spider 59 of differential C to rotate about the stationary sun gear 58, thereby turning the sun gear 57 and causing the spider 39 of differential B to rotate about the stationary sun gear 38. This action, in turn, causes the sun gear 37 to move in such manner as to turn the spider 19 of the differential A a sufficient amount to feed through the rolls 2 the additional fraction of an inch for each rotation of the shears 3.

From this description it is evident that, by means of other combinations of settings of the levers 44, 64 and 84, the mechanism may be regulated to cut material to any length expressed in feet, inches and sixteenths of an inch between the limits of 5 feet minimum and 10 feet maximum. Likewise, it is clear that the adjusting of the transmission mechanism is extremely simple. It is merely necessary to set the lever 44 to the position corresponding to the number of whole feet in the expression of the length of the pieces to be cut, and shift the levers 64 and 84 to the positions corresponding to the inches and fractions of an inch, respectively, used in the expression of length. When the transmission 5 is mounted in a suitable housing or gear case, the operating levers 44, 64 and 84 project through suitable slotted openings in the case, in a well known manner, and the various positions of the levers are marked to indicate the f..t, inches and fractions of an inch in such manner that the proper setting of the levers may be made expeditiously and without difficulty by the machine operator.

Although I have shown a representation of one particular mechanism for practicing my invention, it is to be understood that apparatus for accomplishing the objects of the invention may be constructed in accordance therewith in many ways with different arrangements of the component parts, and may be arranged to cut material to lengths expressed in other measuring units or parts thereof without departing from the spirit and scope of the invention defined in the appended claims.

I claim:

1. In a shear mechanism, a rotary flying shear, a feeding device for delivering strip to the shear, a motor, and mechanically-positive driving connections extending from the motor to the shear and to the feeding device, the driving connection between the motor and shear including a differential gear consisting of a pair of sun gears and a planetary gear and a selective gear changer arranged to be operably coupled between the planetary gear and one of the sun gears of the differential gear to vary the speed of the shear with relation to that of the feeding device for cutting strip into different predetermined lengths.

2. In a shear mechanism, a rotary flying shear, feed rolls for delivering strip to the shear, a motor, and mechanically-positive driving connections extending from the motor to the shear and to the feed rolls, the driving connection between the motor and shear including a plurality of differential gears and gear changers arranged in cascade relation to vary the speed of the shear with relation to that of the feed rolls for cutting strip into different predetermined lengths.

3. In a shear mechanism, a rotary flying shear, feed rolls for delivering strip to the shear, a motor, and mechanically-positive driving connections extending from the motor to the shear and to the feed rolls, one of said driving connections including a plurality of differential gears connected in cascade relation and a selective gear changer associated with each differential to vary the speed ratio of the shear and the feed rolls for cutting strip to different predetermined lengths.

4. In a shear mechanism, a rotary flying shear, feed rolls for delivering strip to the shear, a motor, and a mechanically-positive driving mechanism disposed to connect the motor to both the shear and the feed rolls, said driving mechanism including a primary differential gear, a secondary differential gear connected in cascade relation to the primary differential gear, a selective gear changer connected to actuate the primary differential through the secondary differential to vary the speed ratio of the shear and the feed rolls, and a second selective gear changer connected to actuate the secondary differential thereby actuating the primary differential to superimpose upon the speed ratio established by the first gear changer, lesser variation in the speed ratio of the shear and the feed rolls, for cutting strip to different predetermined lengths.

5. In a shear mechanism, a rotary flying shear, feed rolls for delivering strip to the shear, a motor, and a mechanically-positive driving mechanism connecting the motor to both the shear and the feed rolls, said driving mechanism including a primary differential through which motion is transmitted from the shear to the feed rolls, a secondary differential connected in cascade relation to the primary differential, a selective gear changer connected to transmit motion through the secondary differential to actuate the primary differential for changing the speed ratio of the shear and the feed rolls by predetermined steps, and a second selective gear changer connected to actuate the secondary differential to vary the motion transmitted through it thereby actuating the primary differential for changing the speed ratio of the shear and the feed rolls by predetermined lesser steps superimposed upon the steps established by the first gear changer, for cutting strip into predetermined lengths corresponding to the different speed ratios.

6. In a flying shear mechanism, in combination, a shear, a feeding device disposed to feed to the shear strip material to be cut to predetermined lengths, a motor for driving the shear and the feeding device, and a transmission mechanism connecting in mechanically-positive manner the motor to the shear and to the feeding device, said transmission mechanism comprising a gear changing unit connected to vary the speed ratio between the shear and the feeding device to alter the length of cut by increments of major units of length and a second gear changing unit connected to the first unit to vary its operation in such manner as to superimpose upon the length of cut established by it, increments of minor units of length.

7. In a flying shear mechanism, in combination, a shear, a feeding device disposed to feed to the shear strip material to be cut to predetermined lengths, a motor for driving the shear and the feeding device, and a transmission mechanism connecting in mechanically-positive manner the motor to the shear and to the feeding device, said transmission mechanism comprising a gear changing unit connected to vary the speed ratio between the shear and the feeding device to alter the length of cut by increments of major units of length, a second gear changing unit connected to the first unit to vary its operation in such manner as to superimpose upon the length of cut established by it, increments of minor units of length and a third gear changing unit connected to the second unit to vary its operation in such manner as to superimpose upon the length established by the first and second units increments of fractions of the minor unit of length.

8. In a flying shear mechanism, in combination, a shear, a feeding device disposed to feed to the shear strip material to be cut to predetermined lengths, and a transmission mechanism comprising a differential gear having three elements, one of which is disposed to be actuated by the shear to transmit motion from it to a second element connected to the feeding device and a change-gear mechanism for selectively actuating a third element to regulate the ratio at which motion is transmitted thereby regulating the length to which the strip material is cut.

9. In a flying shear mechanism, in combination, a shear, a feeding device disposed to feed to the shear strip material to be cut to predetermined lengths, a motor connected to drive both the shear and the feeding device, and a transmission mechanism comprising a plurality of differential gears connected in cascade relation each having three elements, one element of the first differential being disposed to transmit motion from the shear to a second element thereof hence to the feeding device, a change-gear mechanism including another differential for selectively actuating a third element of the first differential, a second change-gear mechanism including a third differential for actuating the second differential and a third change-gear mechanism for actuating the third differential, whereby the first change-gear mechanism regulates the ratio at which motion is transmitted to accomplish adjustment of length of cut in major units, the second regulates the length of cut in minor units superimposed upon the first and the third regulates the length of cut in fractions of the minor unit superimposed on the second.

10. A flying shear mechanism comprising a driving motor a rotary shear, pinch rolls disposed to feed to the shear material to be cut, a transmission mechanism connecting the motor to the shear and to the pinch rolls, a differential mechanism in the transmission mechanism comprising sun gears and planetary gears, one sun gear of said differential being connected to the shear and the other to the pinch rolls, and means connected to the planetary gears for selectively rotating them to vary the speed ratio between the shear and the pinch rolls.

11. A flying shear mechanism comprising a driving motor, a rotary shear, a pair of pinch rolls disposed to feed to the shear material to be cut, a transmission mechanism connecting the motor to the shear and to the pinch rolls, a differential mechanism in the transmission mechanism comprising sun gears and planetary gears, one sun gear of said differential being connected to the shear and the other to the pinch rolls, and a selective gear changing transmission for connecting the planetary gears to the motor to rotate them to vary the speed ratio between the shear and the pinch rolls.

12. In a flying shear, in combination, a shear, a rotating member connected to drive the shear, a measuring pinch roll feeding device disposed to feed strip material to the shear, a motor disposed to drive both the shear and the feeding device, and a speed change gear mechanism interposed between the measuring pinch rolls and the shear rotating member and connecting them to rotate in mechanically-positive manner whereby for each revolution of the shear a definite length of strip material will be fed by the pinch rolls to the shear in accordance with the setting of the change gear device, said change gear device comprising a main differential unit, two elements of which transmit motion between the pinch rolls and the shear and a gear shifting unit connected to the third element for actuating it to add to the motion transmitted from the pinch rolls to the shear a predetermined amount to change the length of material cut by increments of major units, a second differential disposed to transmit motion from the first gear shifting unit to the first differential, a second gear shifting unit connected to one element of the second differential for actuating it to add to the motion transmitted by the first differential an amount to change the length of material cut by increments of minor units, a third differential disposed to transmit motion from the second gear shifting unit to the second differential and a third gear shifting unit connected to actuate one element of the third differential to add to the motion transmitted by it to the first differential to change the length of material cut by increments of fractions of the minor unit.

In testimony whereof, I sign my name.

FLORENCE C. BIGGERT, Jr.